United States Patent [19]

Docteur

[11] 4,121,330

[45] Oct. 24, 1978

[54] METHOD OF MAKING INK ROLL WITH FABRIC COVER RETENTION AND PROTECTION DEVICE

[75] Inventor: Russell William Docteur, Canadaigua, N.Y.

[73] Assignee: Burroughs Corporation, Detroit, Mich.

[21] Appl. No.: 782,105

[22] Filed: Mar. 21, 1977

Related U.S. Application Data

[62] Division of Ser. No. 681,541, Apr. 29, 1976, Pat. No. 4,069,758.

[51] Int. Cl.[2] .......... B23P 17/00

[52] U.S. Cl. .......... 29/412; 29/148.4 D; 29/432; 29/450

[58] Field of Search .......... 29/412, 432, 450, 235, 29/526, 148.4 D, 119, 120, 123, 130, 131; 101/348, 148, 205

[56] References Cited

U.S. PATENT DOCUMENTS

| | | | |
|---|---|---|---|
| 1,509,584 | 9/1924 | Chambers | 29/131 |
| 2,066,031 | 12/1936 | Cowan | 101/348 |
| 2,966,724 | 1/1961 | Swope | 101/348 X |
| 3,035,331 | 5/1962 | Wieman | 29/148.4 D X |

FOREIGN PATENT DOCUMENTS

| | | | |
|---|---|---|---|
| 1,282,256 | 11/1968 | Fed. Rep. of Germany | 29/131 |
| 295,204 | 8/1928 | United Kingdom | 29/148.4 R |

*Primary Examiner*—Victor A. DiPalma

*Attorney, Agent, or Firm*—Lynn L. Augspurger; Kevin R. Peterson; Edward J. Feeney, Jr.

[57] ABSTRACT

Disclosed is a fabric covered ink roll and method of making same. The ink roll has side washers with peripheral lips clinching the fabric cover into the roll. The method disclosed can be performed semi-automatically using a collapsible mandrel which permits the roll to be covered with fabric and the fabric clinched to the roll.

3 Claims, 9 Drawing Figures

METHOD OF MAKING INK ROLL WITH FABRIC COVER RETENTION AND PROTECTION DEVICE

This is a division, of application Ser. No. 681,541, filed Apr. 29, 1976, and now U.S. Pat. No. 4,069,758.

BACKGROUND OF THE INVENTION

1. Field of the Invention

This invention relates to fabric ink rolls and more particularly to fabric ink rolls with a fabric cover retainer washers as a protection device and the method of making the same.

2. Description of Prior Art

Prior art ink rolls known to me to be made commercially today are assembled of a core material of fabric, encompassing with the meaning utilized herein, material, woven or non-woven, of cloth, wood, paper, sponge rubber and other fibers. Typically the cores are made by rolling a laminate of paper and cloth. Then the rolls are sliced to form a core. These cores are then covered with a sock material, protected with a plastic retainer or ride shield and impregnated with ink.

A description of the prior art utilized commercially today is shown in the drawings and described further in the following description.

In usage these rolls are utilized for applying ink either directly to a surface to be printed upon, or to a transfer roll. Typical uses would be the ink roller for the Burroughs* A150 keypunch or the Burroughs* S100 endorser (*Burroughs is a trademark of Burroughs Corporation, assignee of this application).

SUMMARY OF THE INVENTION

In order to provide a product of superior performance and lower cost, the present invention is directed to an improved fabric ink roll and the method of making it.

The object of the invention is to provide an improved fabric ink roll wherein the ink roll is encased in an outer fabric cover, called a sock, which is drawn tightly over the roll and retained by a retaining washer clinched into the roll.

It is a further object of this invention to provide a fabric ink roll wherein the retainer washer is clinched into the roll at a point toward the periphery of the roll so as to provide support for the ink roll surface and to distribute the impact force applied to the roll and to reduce wear.

It is a further object of the invention to provide an improved method of making a fabric ink roll wherein an outer fabric, called a sock, is drawn over the outside surface of the core roll assembly and a retaining washer is clinched into the fabric sock and into the core material to retain the fabric about the roll's outside diameter.

DESCRIPTION OF THE DRAWINGS

The above and other objects, advantages and features of the present invention will become more readily apparent from a review of the following description when taken in relation to the drawings wherein:

FIG. 1, comprising

FIG. 1A is a perspective view of the prior art ink roll; and FIG. 1B is a sectional view of the fabric ink roll and FIG. 1A as taken along section 1B.

GENERAL DESCRIPTION OF THE INVENTION

Figure 1A:
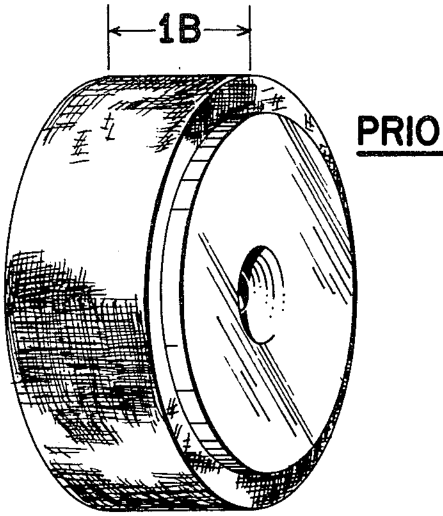
FIGS. 1A and 1B is an illustration of a prior art fabric ink roll.
Figure 1B:
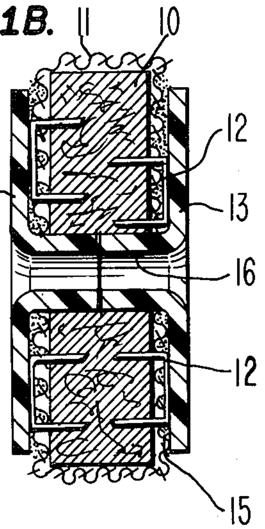
PRIOR ART FIG. 1B.

The prior art ink rolls, as illustrated in FIGS. 1A and 1B have a core roll 10 which is covered with a sock 11 which is stapled to the core with staples 12. A pair of retainers or retaining washers 13 and 14 are affixed to the outer surface of the sock 11 with glue or adhesive 15 or by side pressure applied to the inner surface of the center bore, or by a combination of these elements. The retaining washers sometimes are inserted partially or fully into the core with an extension of the retainer washer inserted within the inside diameter of the roll 10. This inner extension may be formed as an integral part of the retainer washer and abuts the opposing retaining washer on the opposite side. The entire assembly including the stapling of the outer sock to the fabric core, is done manually, a slow process which does not yield the uniform product characteristic of my invention.

Figure 2:
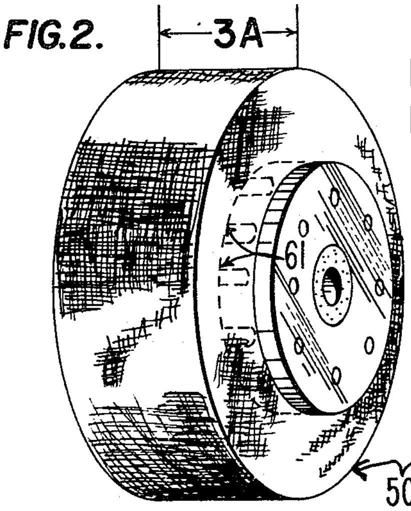
FIG. 2 is a perspective view of the fabric ink roll in accordance with the preferred embodiment of the invention.

In contrast with the prior art this invention provides an improved product as illustrated in FIGS. 2 and 3.

Figure 3A:
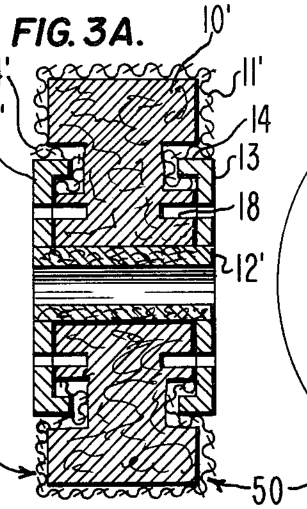
FIG. 3A is a section of the fabric ink roll of FIG. 2 taken along section 3A of FIG. 2.
Figure 3B:
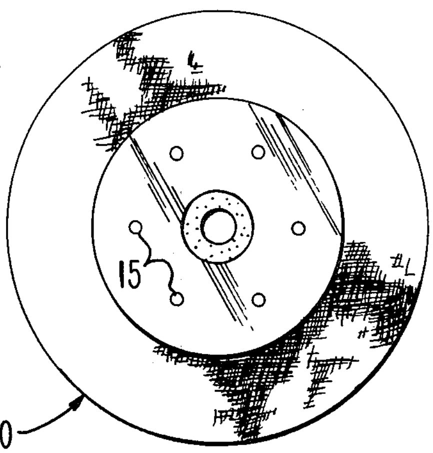
FIG. 3B is a plan view of the side of the fabric ink roll of FIG. 2.

The preferred embodiment of the invention is shown in the plan view of FIG. 3B and in perspective in FIG. 2. Like prior art the proper ink roll consists of a core roll 10' as the core of the fabric ink roll. The core roll 10' is covered with a sock 11'. The sock is made of a woven, preferably knitted material such as nylon, or cotton, which will not be affected by the ink utilized in the ink roll. The knitted sock is preferably made from nylon which is knitted on a circular knitting machine such that a long tubular sock results. This tubular sock must be stretched slightly to have an inner diameter equal to the outer diameter of the core roll 10'. This sock material is purchased as tubes, and during the process of manufacture is initially mounted on a stocking mount post 20, shown in FIG. 4.

Figure 5:
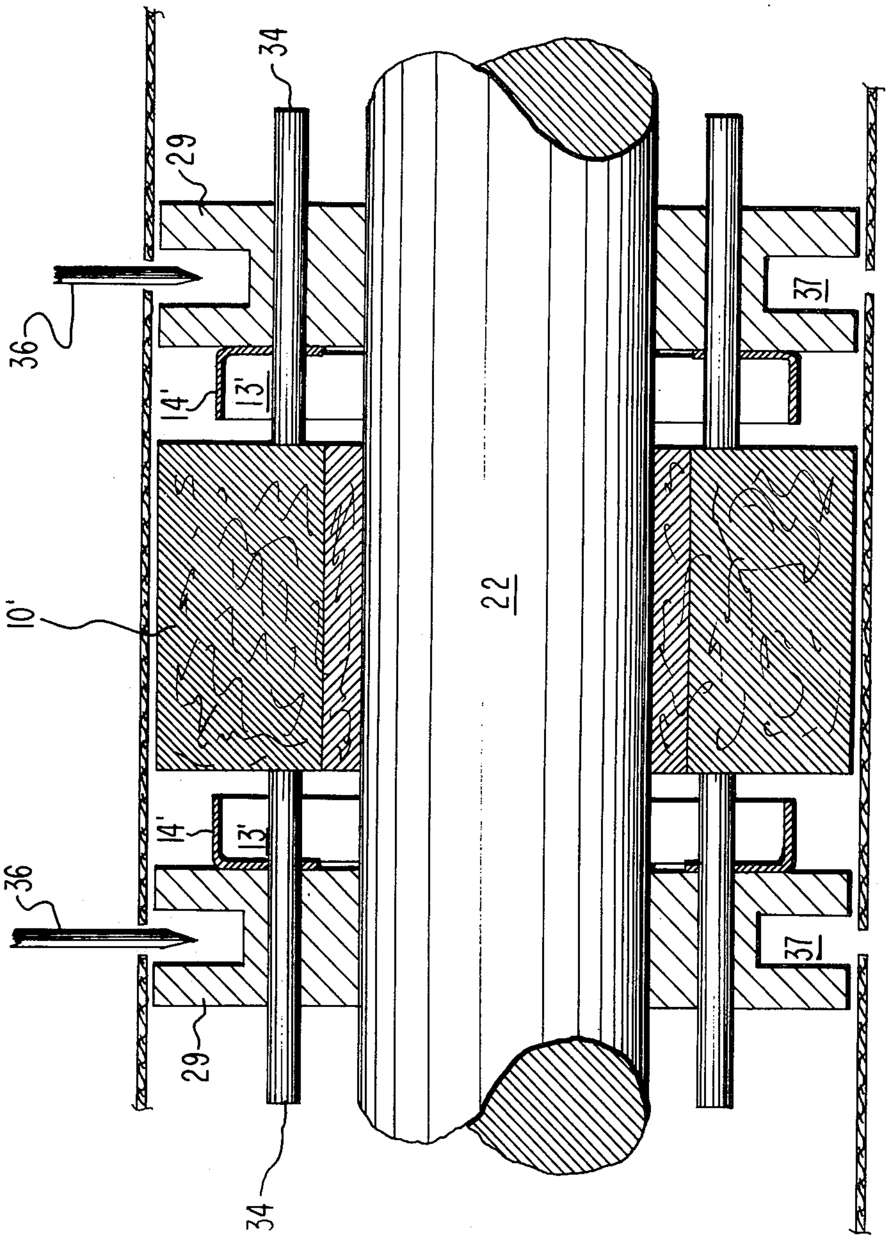
FIG. 5 illustrates an early or initial step in the method of making the fabric ink roll.
Figure 6:
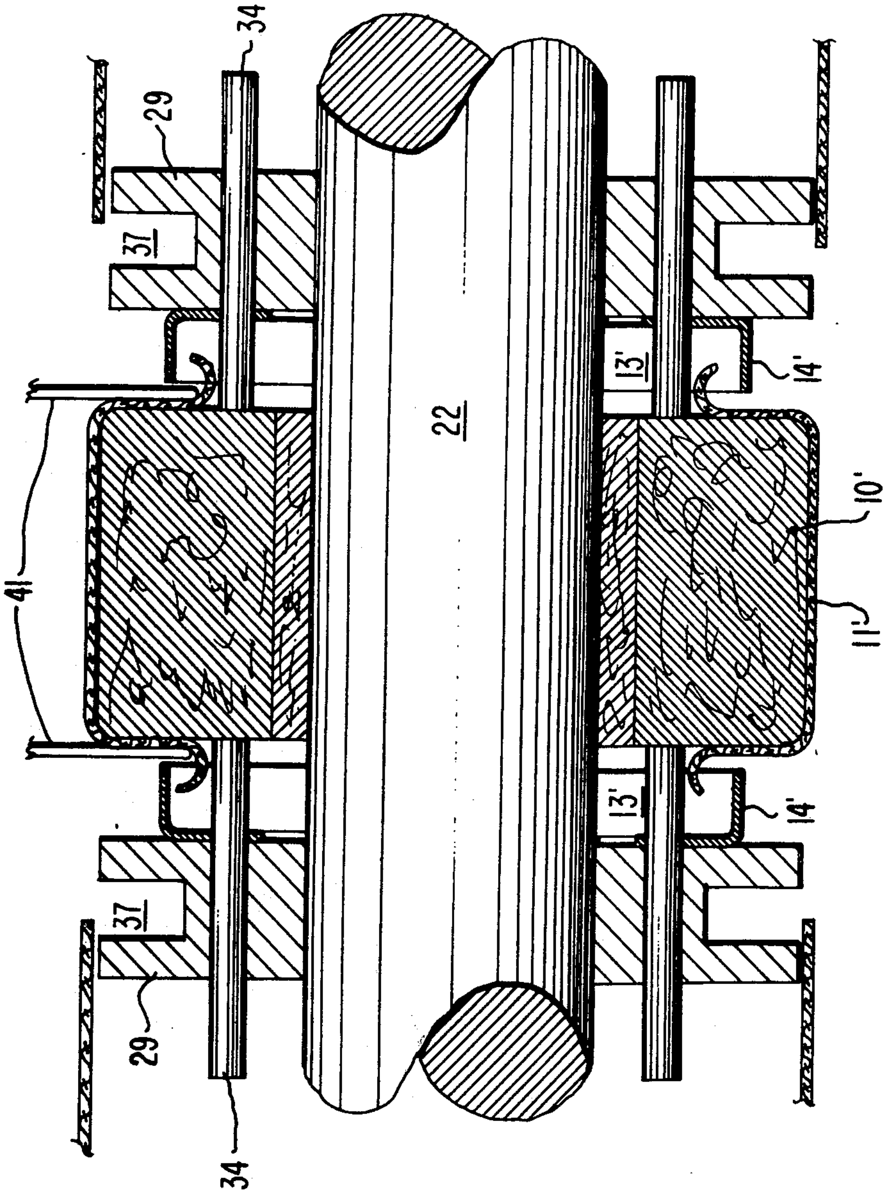
FIG. 6 illustrates a subsequent step in the method of making the ink roll.
Figure 7:
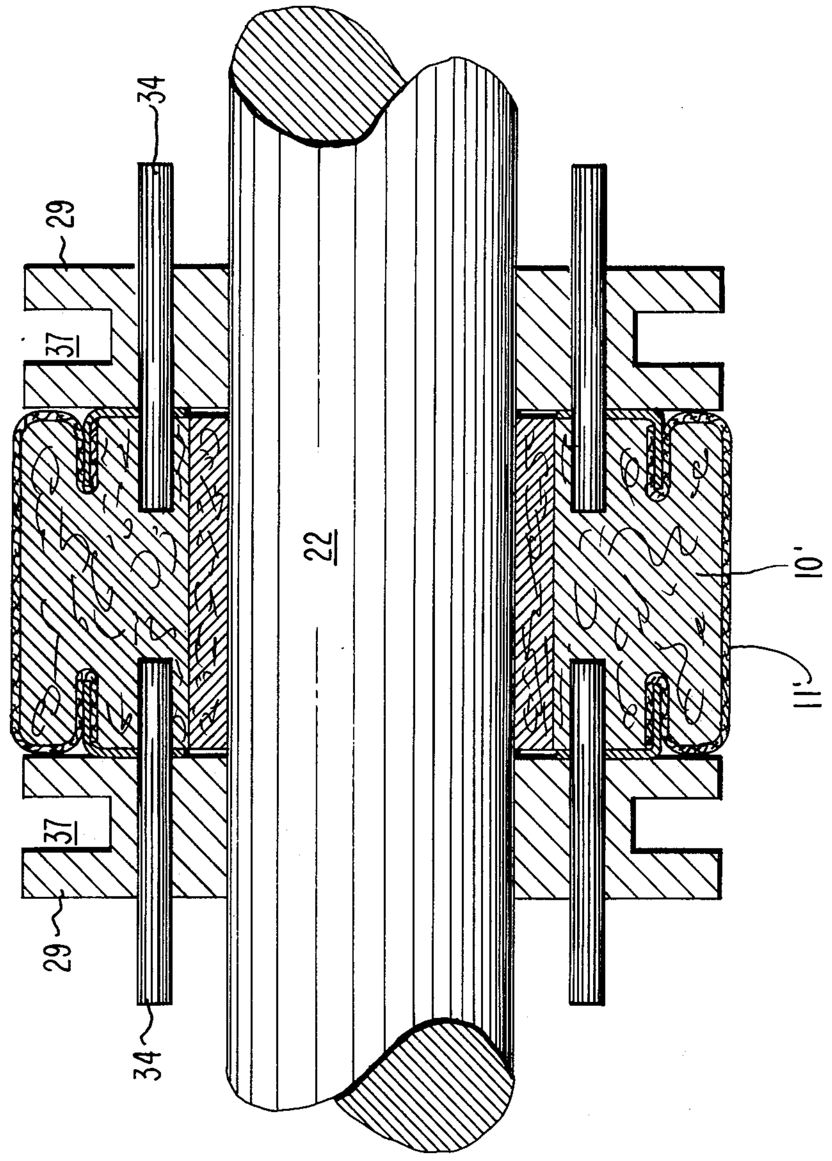
FIG. 7 represents a tertiary step in the method of making the fabric ink roll in accordance with the invention.

The core roll 10' of the preferred embodiment is preferably formed of layers of paper which will readily absorb the ink used in the finished roll. These layers may be rolled on an inner mounting tube 12' which may extend beyond the side face of the fabric roll 10', shown in FIG. 3A, or may be flush with the side thereof as shown in FIGS. 5–7. Alternatively, the roll is formed on a rotating arbor which is removed after manufacture.

Instead of having a plastic retainer washer 13 as shown in FIGS. 1A and 1B in the prior art, I prefer to use a metal retaining washer 13' which has an outer peripheral lip 14' for clinching the retaining washer 13' into the core roll 10' to retain the sock taut about the outer diameter of the core roll 10'.

During the process of manufacture, the metal retaining washers have the outer lips 14' pressed into the core roll 10' to lock or clinch two sides of sock 11' into the core roll 10'. Aperatures 15 are provided in the metal retaining washer 13' which interconnect with a recess

18 formed in core roll 10′ during the process of manufacture (FIG.3A).

As shown in FIGS. 5, 6, and 7, a pin 34 is placed through each of the apertures 15 to mount the retaining washer 13′ on a spacer 29. These pins are driven into the core during manufacture, forming in the process apertures 18 which expose the center of the core to atmosphere and providing a passageway for ink to enter.

It will be noted that the outer lip 14′ which clinches the sock 11′ to the core roll 10′ is located more than half way between the center of the ink roll and the outer diameter. The preferred inner penetration of this between $\frac{1}{8}$ to $\frac{3}{8}$ of the thickness of the core roll 10. This lip acts as a pressure plate which receives the forces of impact at the edge of the ink roll and distributes them evenly about the ink roll. However, because the penetration does not sever the roll, the entire roll can be impregnated with ink. The lip is shown as a solid rim of the washer. It may be serrated, or composed of bent tabs, as shown in dotted lines in FIG. 2, as an alternate.

The performance of the metal retaining washer rolls has proved especially effective when the ink roll is utilized in applications where impacts occur at a very high rate of speed. This allows the preferred embodiment, as opposed to prior art, additional applications for ink rolls of this type. Also, we noted that adhesive is not utilized in the course of manufacture. Manual labor which is required in the prior art to staple the sock to the core roll is eliminated.

These accomplishments have been achieved because of the method of manufacture of the aforementioned core roll 10′ as illustrated in FIGS. 4–7.

As previously mentioned, the sock 11′ is purchased in long length tubular material which are pulled over a stocking mount post 20. This stocking mount post may be driven horizontally against an arbor cap 21 which is screwed on an arbor 22 which is mounted in a V-block 23 which is keyed to a cam slides 24 and 25 which are slidably mounted on a frame 26. A spring 45 biases the cap 21 to the extended portion.

The elements 21 through 26 can be collectively referred to as the arbor mandrel 27. Action by impact of the stocking mount post 20 on the arbor cap 21 causes the arbor mandrel to collapse and in the process form the core rolls by pushing the intermediate spacer's against retaining washers 13′. As the applied force causes the V-block to move to the left, this forces the cam slides 24 and 25 upwardly and downwardly respectively against the frame 26. This collapse occurs at the terminal stage of the process which will be described.

Figure 4:
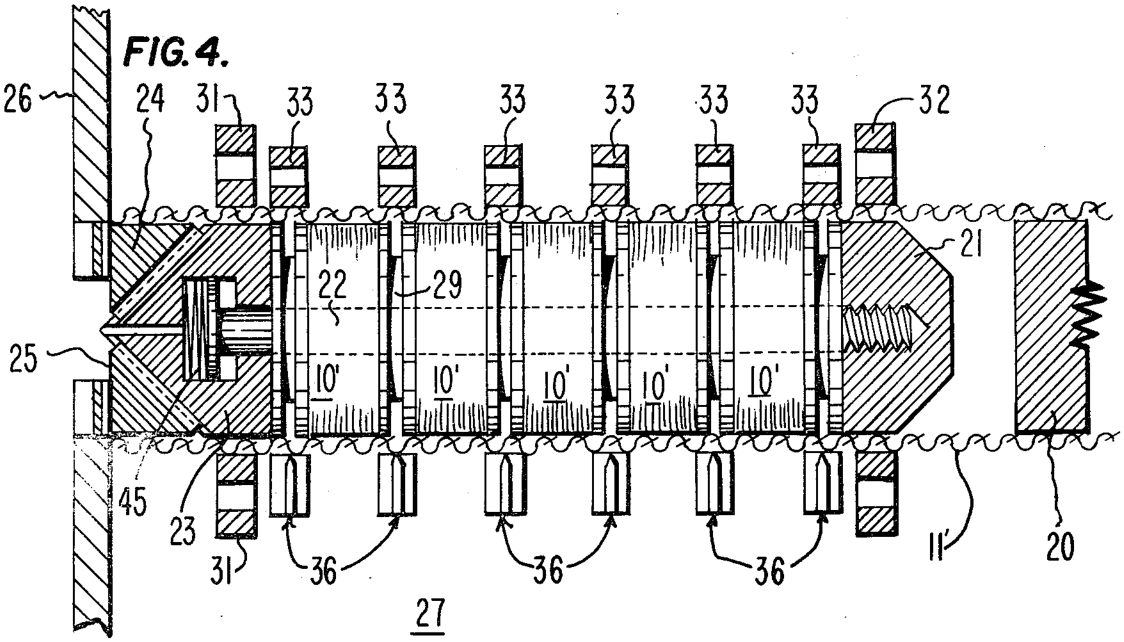
FIG. 4 is a view, partially in section, of the mandrel utilized in connection with the method of making the fabric ink roll of FIG. 2.

It will be understood that the drawing of FIG. 4 is a schematic illustration of the process and is not intended to be drawn to scale or to illustrate in manufacturing detail all on the elements. Such details are within the skill of the art.

The process of manufacture subsequent to the schematic illustration of FIG. 4 is elaborated in FIGS. 5, 6 and 7.

The process of manufacture of the ink roll at the start is shown in FIG. 4. The sock 11′ is drawn over the arbor mandrel and clamp rollers 31 and 32 clamp the sock to the V-block 23 and the arbor cap 21. The spacers 29 are also contacted with the pressure roller 33 at one side thereof so as to retain the sock against each spacer roller 29 individually.

As shown in FIG. 5 each spacer roller 29 has pins 34 inserted therethrough, there being six pins in each of the spacer rollers to intersect a corresponding six pin holes in the retaining washer 13′. In FIGS. 5, 6 and 7 the pressure rollers 33 are not shown but they hold the sock 11′ against the spacer roller 29 on the side opposite the cutter blade 36. The cutter blade advances into spacer slot 37 and rotates along with the pressure roller anout the arbor and severes a portion of the sock 11′ from the tubular sock as the cutting blade 36 rotates about the spacer 29. At the same time the pressure rollers 33 maintain the sock 11′ in position over the core roll 10′.

Subsequently the cutter blade is withdrawn from the slot or groove 37 and insert tines 41 tuck the sock against the side surfaces of the core roll 10′ as shown in FIG. 6. As the insert tines 41 are removed the stocking mounting post 20 shown in FIG. 4 is advanced against the arbor cap 21 and pressure applied thereto while the tines 41 are withdrawn causes the reatining washer 13′ to hold the sock 11′ against the side wall of the core roll 10′.

Continuing movement of the post 20 forces the pins and the cutting lip 14′ of the retaining washer 13′ into the core roll 10′ to clinch the sock 11′ into the core roll 10′ as shown in FIG. 7. Subsequently, the stocking mounting post 20 is fully retracted, the arbor cap unscrewed and the ink rolls are removed from the arbor mandrel 27. The spacers are removed and the finished fabric ink roll 50 shown in FIG. 2 and 3 is complete and ready for inking. It is inked by soaking the finished roll 50 in ink.

While the preferred embodiment of the invention has been shown in detail and with reference to the prior art known to me, various modifications and rearrangements may be made in the product and process of making the same as may occur to those skilled in the art both now and in the future, the scope of my invention is to be determined with reference to the following claims.

What is claimed is:

1. A process of manufacturing ink rolls comprising the steps of, assembling a plurality of ink core roll blanks on an arbor mandrel, with a spacer roller intermediate adjacent core roll blanks and a retaining washer with peripheral clinch lip between the spacer roller and each of the associated blanks, drawing a sock over the assembled ink rolls while the roll blanks are on the arbor mandrel, and severing the fabric sock from the length thereof to a length shorter than the original length, and tucking the shorter length to both sides of the fabric roll, and pressing each of said retaining washers having a clinch lip into the fabric sock and into the associated core roll to clinch the sock to the original blank core roll to hold the sock taut against the outer surface of the associated core roll.

2. A process according to claim 1 wherein each of said retaining washers and spacer rollers has a plurality of apertures formed therein and pins are placed through said apertures to mount said retaining washers on said spacer rollers by the pin connection through a corresponding aperture in the retaining washer and associated spacer roller.

3. A process according to claim 2 wherein said pressing also drives said associated core rolls against said pins and forces said pins to penetrate said core roll.

* * * * *